(12) United States Patent
Schonlau

(10) Patent No.: US 7,432,879 B2  
(45) Date of Patent: Oct. 7, 2008

(54) PERSONAL VIEWER

(76) Inventor: William J. Schonlau, 31107 Marne Dr., Rancho Palos Verdes, CA (US) 90275-5615

( * ) Notice: Subject to any disclaimer, the term of this patent is extended or adjusted under 35 U.S.C. 154(b) by 683 days.

(21) Appl. No.: 10/776,401

(22) Filed: Feb. 10, 2004

(65) Prior Publication Data

US 2004/0164926 A1  Aug. 26, 2004

Related U.S. Application Data

(60) Provisional application No. 60/446,507, filed on Feb. 10, 2003.

(51) Int. Cl.  
*G09G 5/00* (2006.01)
(52) U.S. Cl. ............................................... 345/8; 345/7
(58) Field of Classification Search ............. 345/8, 345/7; 348/115; 359/630  
See application file for complete search history.

(56) References Cited

U.S. PATENT DOCUMENTS

| | | | | |
|---|---|---|---|---|
| 4,045,116 A * | 8/1977 | La Russa | ...................... | 359/364 |
| 5,320,538 A * | 6/1994 | Baum | ...................... | 434/307 R |
| 5,337,991 A * | 8/1994 | Young | ........................... | 345/8 |
| 5,844,530 A * | 12/1998 | Tosaki | .......................... | 345/8 |
| 5,936,663 A * | 8/1999 | Tabata et al. | .................. | 348/51 |
| 6,160,666 A * | 12/2000 | Rallison et al. | ............. | 359/630 |
| 6,266,194 B1 * | 7/2001 | Tanijiri et al. | ............... | 359/631 |
| 6,313,864 B1 * | 11/2001 | Tabata et al. | ............. | 348/14.02 |
| 2004/0130783 A1 * | 7/2004 | Solomon | ..................... | 359/462 |

* cited by examiner

*Primary Examiner*—Ricardo L Osorio  
(74) *Attorney, Agent, or Firm*—Kelly Lowry & Kelley LLP

(57) ABSTRACT

A personal viewer system includes a head-mounted display linked to an optical generator which receives images from an electronic image source. The head-mounted display includes a scanner which receives light-based optical images from the optical generator and scans these images onto at least one ellipsoid reflector positionable in front of the eye of a user, such that a scanned image is reflected into the eye of the user. Preferably, the at least one ellipsoid reflector has an inner surface that is only partially reflective so as to permit viewing therethrough. The head-mounted display may include a motion orientation sensor for altering the generated image as the user's head is moved.

18 Claims, 7 Drawing Sheets

PERSONAL VIEWER

RELATED APPLICATION

This application claims priority to U.S. Provisional Application Ser. No. 60/446,507, filed Feb. 10, 2003.

BACKGROUND OF THE INVENTION

The present invention generally relates to personal viewers, such as head-mounted displays and the like. More particularly, the present invention relates to a personal viewer in the form of a head-mounted display wherein images are scanned onto and reflected from ellipsoidal reflectors positioned in front of the user's eye such that the images are focused onto the eye of the user.

The use of personal viewers for viewing images has largely been relegated to the realm of science fiction. Attempts have been made to provide personal viewing systems, with limited results. For example, Spooner, U.S. Pat. No. 4,340,878 teaches scanning a raster image first, into two fiber optic ribbons and second, onto a large diffuse reflective screen for observation by a user from a comfortable distance. However, the size and distance of the screen do not permit movement with the user in any practical sense and since the same image is perceived by both of the user's eyes, no stereo viewing is possible.

In another example, Ansley, U.S. Pat. No. 5,546,492 teaches a optical fiber ribbon, whose input may be a point source scanned at high-speed or multiple sources operating in parallel, to provide one dimension of the displayed image. The second dimension is produced by scanning (or oscillating) the ribbon orthogonal to the first dimension while varying the fiber inputs in accordance with the image content and scan phase. However, while this provides a satisfactory two-dimensional image for display, it must then pass through projection optics onto a viewing screen for observation. The scanning and projection systems are separated and the same screen is seen by both eyes, excluding the presentation of stereo images.

While methods such as those described above may provide means of viewing an image, such methods lack a wide-field, high resolution, low cost, full color, stereo, see-through image display. Accordingly, there is a need for a wide-field, high resolution, low cost, full color, stereo, see-through image display well suited to a wide variety of uses. The present invention fulfills these needs and provides other related advantages.

SUMMARY OF THE INVENTION

The present invention resides in a personal viewer system which provides a wide-field, high resolution, full color see-through image display which is well suited to a wide variety of uses. The personal viewer system generally comprises an electronic image source, such as a computer, DVD player or the like, and an optical generator adapted to receive an electronic signal from the electronic image source and convert the signal into a light-based optical image. A head-mounted display includes means for receiving the optical image, at least one ellipsoid reflector positionable in front of the eye of a user, and means for scanning the image onto the at least one ellipsoid reflector such that the image is reflected into the eye of the user.

The optical generator typically comprises an image buffer adapted to receive and store electronic image signals from the electronic image source. An image resampling processor is in communication with the image buffer and includes a resampling transformation algorithm for correcting geometric distortion of the electronic image signal. An optical beam modulator is in communication with the image resampling processor and is adapted to emit a light-based optical image.

The optical beam modulator may create a tricolor optical light emission. An optical image mixer may be disposed between the optical beam modulator and an optical fiber for converting the tricolor optical light emission into a single optical light emission. Such an optical image mixer may comprise a mixing cavity having a white inner reflective surface for mixing the tricolor light emission and reflecting the mixed light through a pinhole exit into the optical fiber. Alternatively, the optical image mixer may comprise dichroic mirrors or prisms.

The means for receiving and scanning the image typically comprises a scanner disposed relative to the optical beam modulator or optical fiber to scan the light emission onto the at least one ellipsoid reflector. Such a scanner may comprise a mirror assembly having a first rotatable mirror for receiving the optical image and reflecting the image onto a second rotatable mirror adapted to scan the image onto the at least one ellipsoidal reflector. A driver may be used to adjustably control the speed of rotation of the first and second mirrors, such as by magnetically inducing the rotation of the first and second mirrors. Alternatively, the scanner may comprise a torsion oscillator scan mirror or a solid state micro-electric mirror or the like.

In a particularly preferred embodiment, the at least one ellipsoid reflector has an inner surface that is only partially reflective so as to permit viewing therethrough. Typically, an ellipsoid reflector is positioned in front of each eye of the user.

The head-mounted display may also include a motion orientation sensor in communication with the signal generator or image source for altering the generated image as the user's head is moved to provide orientation parameters in real time for point-of-view dependent image rendering.

Other features and advantages of the present invention will become apparent from the following more detailed description, taken in conjunction with the accompanying drawings, which illustrate, by way of example, the principles of the invention.

BRIEF DESCRIPTION OF THE DRAWINGS

The accompanying drawings illustrate the invention. In such drawings.

DETAILED DESCRIPTION OF THE PREFERRED EMBODIMENTS

As shown in the accompanying drawings for purposes of illustration, the present invention resides in a personal viewer system, generally referred to by the reference number 20, which is designed to provide a user with a wide-field, high resolution, low cost, full color, stereo, see-through image display well suited to a wide variety of uses. Applications include general purpose interactive computer display, video entertainment or instruction, immersive virtual reality gaming, pilot or vehicle operator heads-up display, teleoperated task workspace display, technical reference overlay, navigational environment enhancement and night vision.

Figure 1:
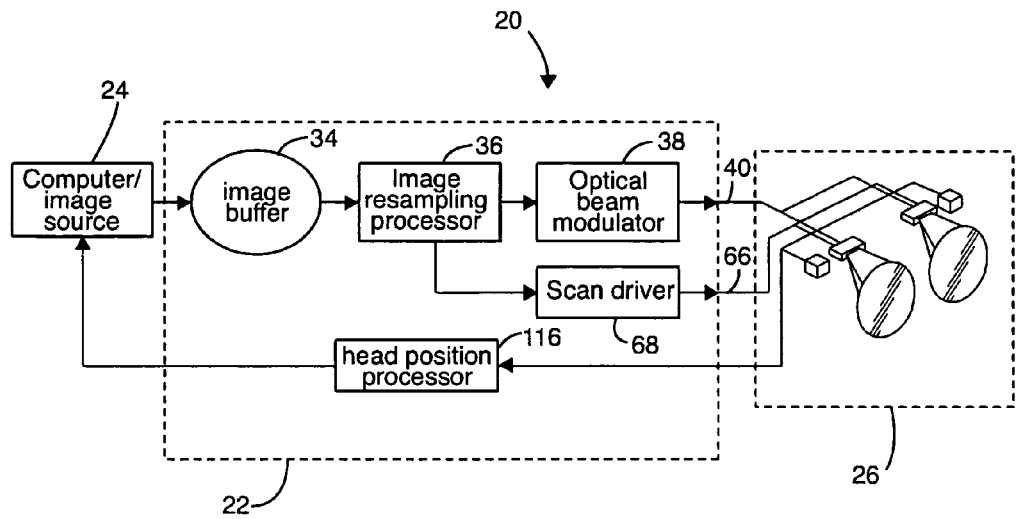
FIG. 1 illustrates a diagrammatic overview of the operation of a personal viewer system of the present invention.
Figure 2:
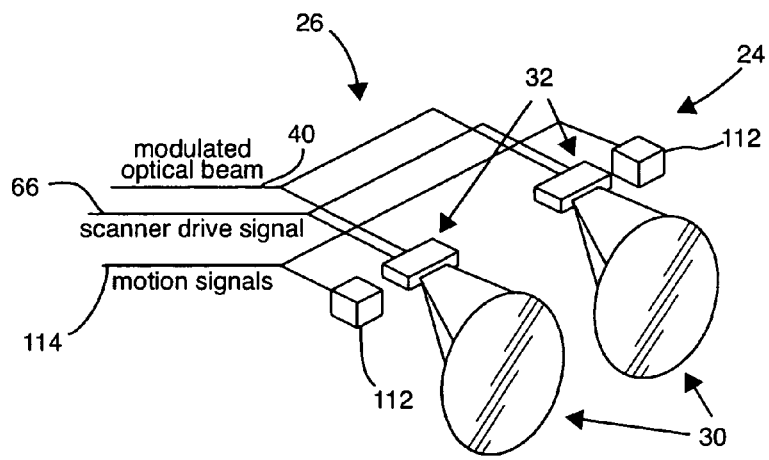
FIG. 2 illustrates a larger view of a head-mounted display used in accordance with the present invention.

With reference now to FIGS. 1 and 2, the system 20 includes an image or signal generator 22 which obtains videos or other electronic images from a source such as a computer, DVD, or the like 24. The generator 22 modifies this image as necessary and transmits it to a head-mounted display 26 which is worn by a user for viewing the images.

The head-mounted display 26 typically includes a frame 28 which may be comprised of any appropriate material, including plastic, steel, titanium, aluminum or any alloy thereof. At least one, and preferably two, ellipsoidal reflectors serve as lenses of the display 26 and are positionable in front of the eyes of the user. As such, the ellipsoidal reflectors 30 are positioned where the lenses of a conventional pair of eyeglasses would be located and are preferably made of a transparent material (e.g. polyimide, polycarbonate, or the like) which is covered with a reflective coating on the inside thereof. In a particularly preferred embodiment, the reflective coating is sufficient to reflect light from scanners 32, while still allowing the user to see through the reflector "lenses" 30.

Figure 3:
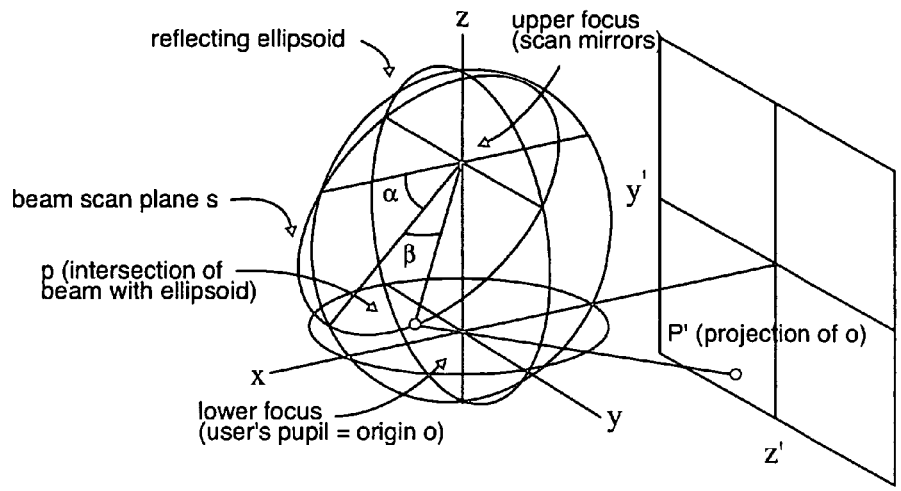
FIG. 3 illustrates the mathematical model of projection system optics used to determine the beam path on the reflective ellipsoid to a user's eye.
Figure 4:
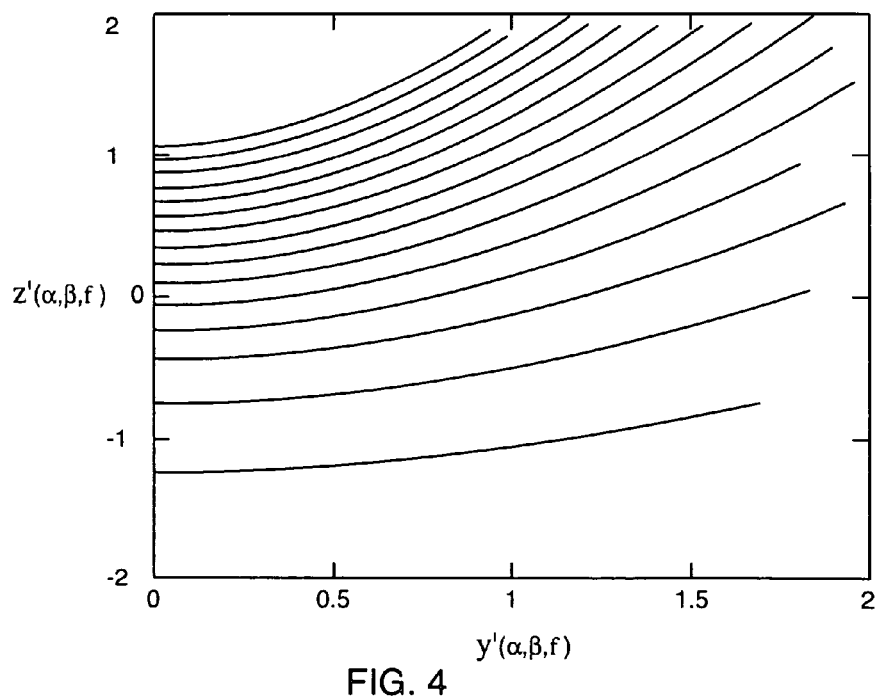
FIG. 4 illustrates the scan line trajectories seen by a user (half field) that show the path of the scanned optical beam on the reflective ellipsoid, developed from the mathematical model of FIG. 9.
Figure 5:
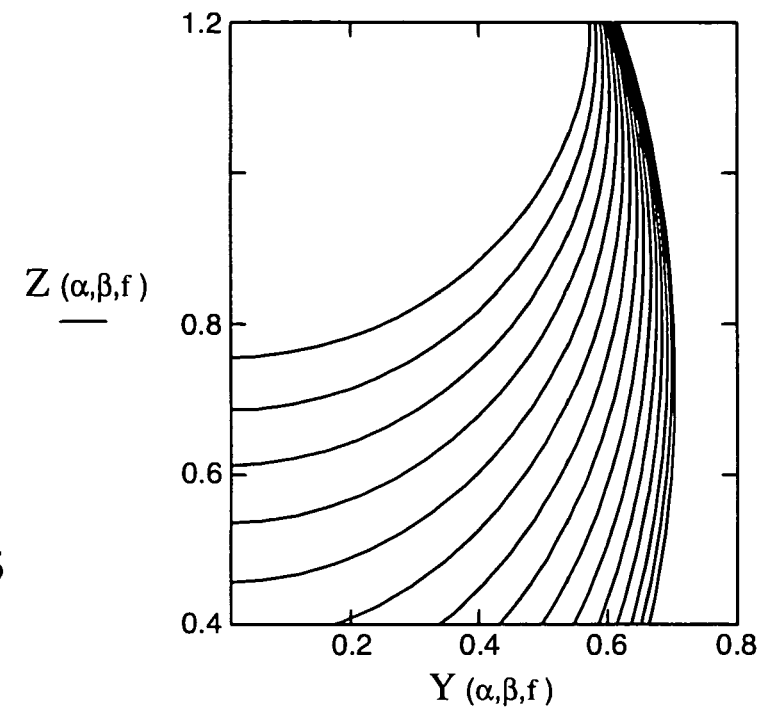
FIG. 5 illustrates the scan line trajectories seen by a user (half field) representing parallel projection of the scan lines in accordance with the mathematical model of FIG. 9.

It is generally understood that rays of light emanating from a point source at one focus of a prolate ellipsoid will all converge at a point at the other focus. FIGS. 3-5 illustrate a mathematical model of projection system optics used to determine the optical beam path on the reflective ellipsoid 30. A planar retinal model is illustrated. The reflecting ellipsoid 30 is illustrated as a complete prolate spheroid (i.e. egg-like or oval shaped) with an upper and lower focus. While only a segment of the spheroid is physically present in the display, showing the whole surface clarifies the optical properties of interest, i.e. that all wave energy emanating from the upper focus is reflected directly to the lower focus or user pupil. As indicated above, for simplicity, a planar retinal model is used here, a more precise model of the optics and retinal curvature of the human eye may be incorporated with little difficulty since that mapping is a simple scalar radial function.

In FIG. 3, the two tall ellipses are intended to look like meridians at 90° in three-dimensions, the horizontal ellipse not being at the "equator", but lower in the horizontal plane of the lower focus. That ellipse defines the horizontal x, y plane of the coordinate system in which the projection calculations are made, intersecting the vertical meridians on the surface of the ellipsoid, again with the intent of showing 3D structure. The x-axis is the optical axis of the user's eye, running through the center of the lens of the user's eye. The y-axis runs horizontally over to the other eye and the z-axis is vertical. The scanners 32 are at the upper focus and, at some instance in time, are scanning a modulated optical beam toward the front of the ellipsoid, along a line that sweeps across the beam scan planes, from side to side. The beam strikes the ellipsoid at point p and is reflected through the user's pupil. The plane s is declined downward with an angle $\alpha$ and the beam is deflected to the side of an angle $\beta$.

The reflecting surface of the viewer is an ellipsoid of eccentricity f with the two foci arranged vertically along the z axis. The major axis (z) is scaled to unity (c=1) and the lower focus of the ellipsoid is positioned at the origin corresponding to the optical center of the user's eye, as shown in FIG. 3. The optical axis of the eye is along the positive x-axis and the projection plane is at the rear of the user's eye (x=−1), orthogonal to the x-axis with the y',z' coordinate frame rotated 180 degrees. The minor axes of the ellipsoid (a and b along the x and y axes respectively) are equal and must have length $(1-f^2)^{1/2}$.

$$\frac{x^2}{a^2} + \frac{y^2}{b^2} + \frac{(z-f)^2}{c^2} = 1 \qquad \frac{x^2}{1-f^2} + \frac{y^2}{1-f^2} + (z-f)^2 = 1 \qquad (1)$$

The scanned beam originates from the upper focus and is deflected into the plane 2, which passes through the upper focus, inclined downward from the x-axis by an angle $\alpha$ and parallel to the y-axis.

The beam is then deflected laterally within the plane s by the angle $\beta$. The objective is then to determine where the beam intersects the ellipsoidal surface (p and project that point through the lower focus onto the y',z' plane, expressing the projected point location (y',z') as a function of ($\alpha$,$\beta$) which are linear with time.

The x and y coordinates of any point on the line passing through the upper focus and the point p are defined as a function of $\alpha$,$\beta$, and z.

$$x = \frac{2 \cdot f - z}{\tan(\alpha)} \qquad y = \frac{\tan(\beta) \cdot (2 \cdot f - z)}{\sin(\alpha)} \qquad (2a, 2b)$$

The point of intersection of the line and the ellipsoid may be found by replacing x and y in equation (1) with the functions from equations (2a) and (2b), yielding a quadratic in z.

$$\frac{(2 \cdot f - z)^2}{\tan(\alpha) \cdot (1 - f^2)} + \frac{\tan(\beta)^2 \cdot (2 \cdot f - z)^2}{\sin(\alpha) \cdot (1 - f^2)} + (z - f)^2 = 1 \quad (3)$$

Solving for z yields two values, the fore and aft intersection. The first solution provides the z coordinate of p at the forward intersection.

$$Z(\alpha, \beta, f) := \frac{f - \frac{\sqrt{\sin(\alpha)^2 + \tan(\alpha)^2 \cdot \sin(\alpha)^2 + \tan(\beta)^2 \cdot \tan(\alpha)^2}}{(\tan(\alpha) \cdot \sin(\alpha))}}{\frac{\tan(\beta)^2}{[\sin(\alpha)^2 \cdot (1 - f^2)]} + \frac{1}{[\tan(\alpha)^2 \cdot (1 - f^2)]} + 1} + \frac{2 \cdot f \cdot \tan(\beta)^2}{\sin(\alpha)^2 \cdot (1 - f^2)} + \frac{2 \cdot f}{\tan(\alpha)^2 \cdot (1 - f^2)}$$

This value for z can be input to equations (2) to obtain the x and y coordinates of p.

$$X(\alpha, \beta, f) := \frac{2 \cdot f - Z(\alpha, \beta, f)}{\tan(\alpha)} \quad (5)$$

$$Y(\alpha, \beta, f) := \frac{\tan(\beta) \cdot (2 \cdot f - Z(\alpha, \beta, f))}{\sin(\alpha)}$$

Finally, the projection of p onto the y',z' plane is determined from the coordinates of p.

$$y'(\alpha, \beta, f) := \frac{Y(\alpha, \beta, f)}{X(\alpha, \beta, f)} \qquad z'(\alpha, \beta, f) := \frac{Z(\alpha, \beta, f)}{X(\alpha, \beta, f)} \quad (6)$$

To observe the scan trajectories, some reasonable values are provided for f, estimated from a model of the human head, and the ranges for the scan angles α and β, intended to provide a complete vertical and horizontal coverage of the eye's field of view. Note that only 120 degree field breadth is required for each eye. These fields overlap by about 60 degrees in the forward direction, giving a total field of approximately 180 degrees.

FIG. 4 shows where the scan lines fall on a planar retina for the α and β ranges given, while FIG. 5 shows a parallel projection of where the scan lines fall on the ellipsoid.

The graphs in FIGS. 4 and 5 are based upon the following:

$$\alpha_{min} := .75 \quad \alpha_{max} := 1.45 \quad \delta_\alpha := .05 \quad f := \frac{\sqrt{2}}{2} \quad \beta_{max} := 1.5 \quad \delta_\beta := .05$$

$$\beta := 0, \delta_\beta \ldots \beta_{max} \qquad \alpha := \alpha_{min}, \alpha_{min} + \delta_\alpha \ldots \alpha_{max}$$

Since the fields are both laterally symmetric, only one side is shown.

Because of the geometric properties of the ellipsoid, the beam will always go through the lower focus (i.e., the user's pupil), regardless of the angles α and β, but the point p' where the beam strikes the user's retina is a straight line projection from the point p where the beam struck the ellipsoid. The purpose of this model is to calculate where the point p' will fall on the retina as a function of the angles α and β, which are piecewise linear functions of time. The path of p' across the y',z' plane (user's retina) is shown in the second figure where each scan line is produced as the angle (beta) increases from 0 to about 60 degrees, only half of the range (−60 to +60 degrees) is modeled because the optics are treated as horizontally symmetric.

While the reflective ellipsoid geometry provides a completely transparent and full field display image, there are two potential problems with the image received by the user. As illustrated in FIG. 4, the scan lines projected onto the user's retina are not straight lines but are strongly curved, particularly at the wider display angles. In FIG. 4, each arc is represented internally as a series of points at uniform time intervals. To present the user with an undistorted image, the scan line trajectories shown in FIG. 4 are superimposed on the incoming image and the image is resampled. While the beam is scanned across the ellipsoid, the beam source is modulated to present the color and intensity of the image at the point under the current scan line arc appropriate to the current instant. The above presented detailed mathematical model describes how the scan line arcs are computed if a planar horizontal scan is employed. It is also necessary to resample the image if a conical horizontal scan is used even though the scan line distortion is much less severe. Also, given the geometry of the reflecting ellipsoid (f,a) and the time linearity of the beam scan angles (α,β), the projection of the raster pattern onto the users retina may be calculated and used to eliminate distortion inherent in the viewer design. The distortion is corrected by superimposing the curves to generate the video signal, a task well within the reach of low cost single chip processors currently available.

Figure 6:
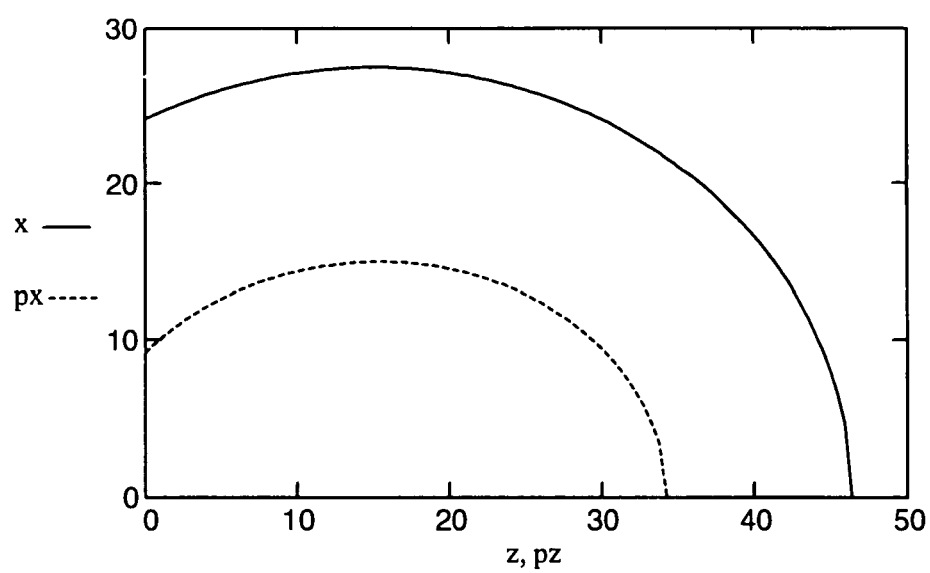
FIG. 6 is a graph depicting the locus of points or surface at which a beam originating from an ellipsoid focus should converge along its path in order to be collimated by reflection from the inside surface of the ellipsoid in accordance with a decollimation plane calculation used in accordance with the present invention.

Another potential problem is that the collimated beam reflected from the inside surface of the ellipsoid reflector 30 is decollimated by reflection from the curved surface. This causes the user to perceive the modulated beam as a small disk instead of seeing a point source at infinity. This can be corrected by generating a beam that is not collimated but instead focused to a point along the beam path that will be collimated by reflection from the ellipsoid reflector 30. FIG. 6 shows a cross-section of the reflecting ellipsoid 30, solid line, with the scan center (upper focus) at (0, 0) and the user pupil at (0, 30). The dotted curved line shows where the beam, radiating from the top focus, should be focused to produce a collimated beam after reflection. Since the depth at which the beam is required to focus varies with the elevation of the scan line, the focus process must be modulated in synchronization with the vertical scan. The following presents a detailed mathematical model of how the decollimation plane is calculated:

$$f := 15 \quad a := 27.5 \quad c := (a^2 + f^2)^{\frac{1}{2}} \quad I := 100 \quad i := 0 \ldots I$$

Ellipsoid surface:

$$\frac{x^2}{a^2} + \frac{(z-f)^2}{c^2} = 1$$

$$z_i := \frac{i \cdot (f + c)}{I} \qquad x_i := a \cdot \left[1 - \left(\frac{z_i - f}{c}\right)^2\right]^{\frac{1}{2}}$$

$$L1_i := [(z_i)^2 + (x_i)^2]^{\frac{1}{2}} \qquad L2_i := [(z_i - 2 \cdot f)^2 + (x_i)^2]^{\frac{1}{2}}$$

Lens law:

$$\frac{1}{L1} + \frac{1}{L2} = \frac{1}{F}$$

For collimated beam:

$$\frac{1}{L1-k} = \frac{1}{F}$$

$$k_i := L1_i - \frac{1}{\frac{1}{L1_i} + \frac{1}{L2_i}}$$

$$px_i := k_i \cdot \frac{x_i}{L1_i}$$

$$pz_i := k_i \cdot \frac{z_i}{L1_i}$$

Techniques that could be used to modulate beam focus at vertical scan rates include: 1) axial movement of a lens or lens pair along the beam path, including the beam generator lens; 2) reflection from a concave membrane mirror with pneumatically controlled curvature; or 3) beam passage through rotating variable-diopter 1-D disk pair. Thus, the parameters of the ellipsoid 30 are chosen to model the requirements of a human observer with a face mounted reflector projecting the beam into the pupil of their eye. In its relaxed state, the human eye prefers a collimated or parallel beam.

Referring again to FIGS. 1 and 2, in use, a user wears the display 26 on their face like a pair of conventional eyeglasses. The image generator circuitry 22 may be incorporated into the head-mounted display 26. However, this can unnecessarily create bulk and be cumbersome. Thus, the image generator 22 is more typically a circuit board within a box worn by the user that is mechanically and electrically connected to the display 26, or the image generator 22 may be located within the image source 24, such as the computer, DVD player, etc.

In any event, the signal generator 22 accepts input from an image source 24, such as a computer, digital camera, video camera, DVD player or the like. The input, in the form of an electrical signal, enters an image buffer 34 before being passed to an image resampling processor 36, which resamples the digital or video display image coming from the image source 24 to correct for geometric distortion using a resampling transformation.

Information from the image resampling processor 36 is then passed to an optical beam modulator 38 which modulates a light-based optical source for emission to the scanners 32. If the modulator 38 is located in the assembly 26, the modulated light may be passed directly to the scanners 32. In this case, the image resampling processor 36 could be in electronic communication with the modulator 38 by means of wires or utilizing a wireless technology. Alternatively, the modulator 38 is a component of the signal generator 22 and is in communication with the scanners 32 by means of an optical fiber 40 which carries the modulated light to the display 26.

Figure 7:
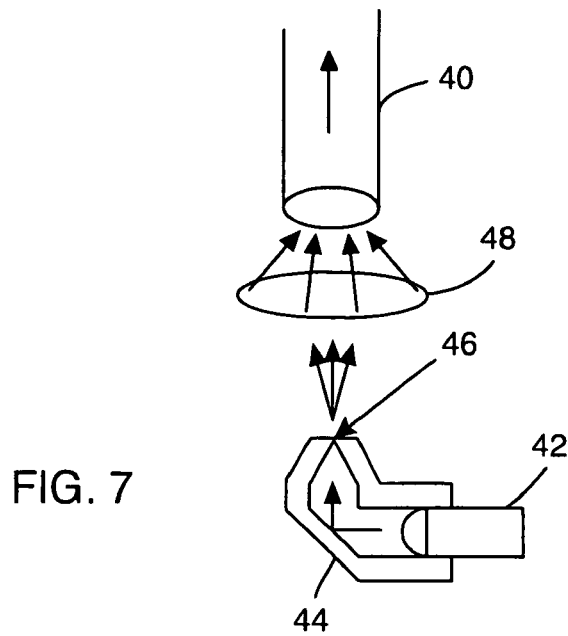
FIG. 7 is a diagrammatic view of a mixing cavity which mixes three primary color optical light sources with a simple diffuse cavity to produce a single beam.

Typically, the modulator 38 modulates a tricolor optical light source. With reference to FIG. 7, a simple cavity light source mixer 42 may be used to mix the three primary color source generated by the signal generator 22 to produce a single beam of light. The tricolor light source may be in the form of a light emitting diode (LED) with three different LED chips where each LED chip emits light of a different color from that emitted by the other two LED chips. That is, one of the chips emits a green light while the other two chips emit blue and red light, respectively. In the alternative, three different laser diodes may be used that emit, respectively, green, blue and red light.

In order to mix the light, a tricolor LED assembly is positioned within an opening of a mixer 44. The interior cavity of the mixer 44 has a diffuse white inner surface. Light is reflected and mixed within the mixing cavity of the mixer 44 and exits the mixing cavity through a pinhole exit 46 where the light then passes into a receiving optical fiber 40. If the optic fiber 40 is not used, a collimating lens 48 may be used to project the beam directly into the scanner.

Figure 8:
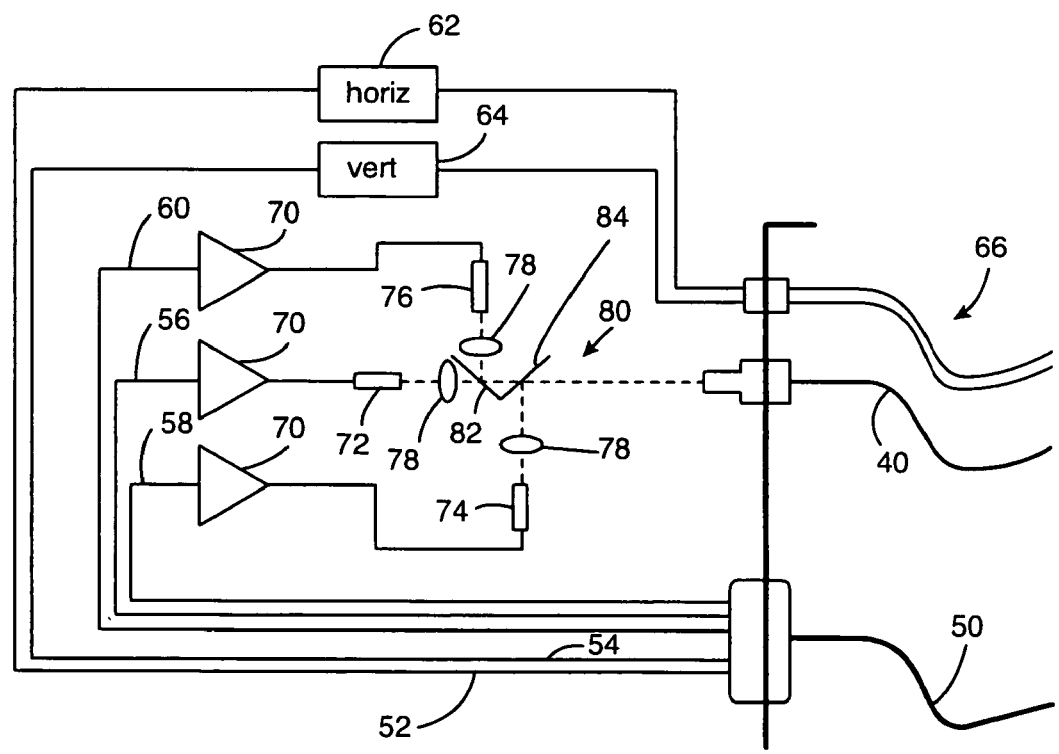
FIG. 8 illustrates an alternative method of mixing three primary color optical light sources with dichroic mirror or coated prisms to produce a single beam.
Figure 9:
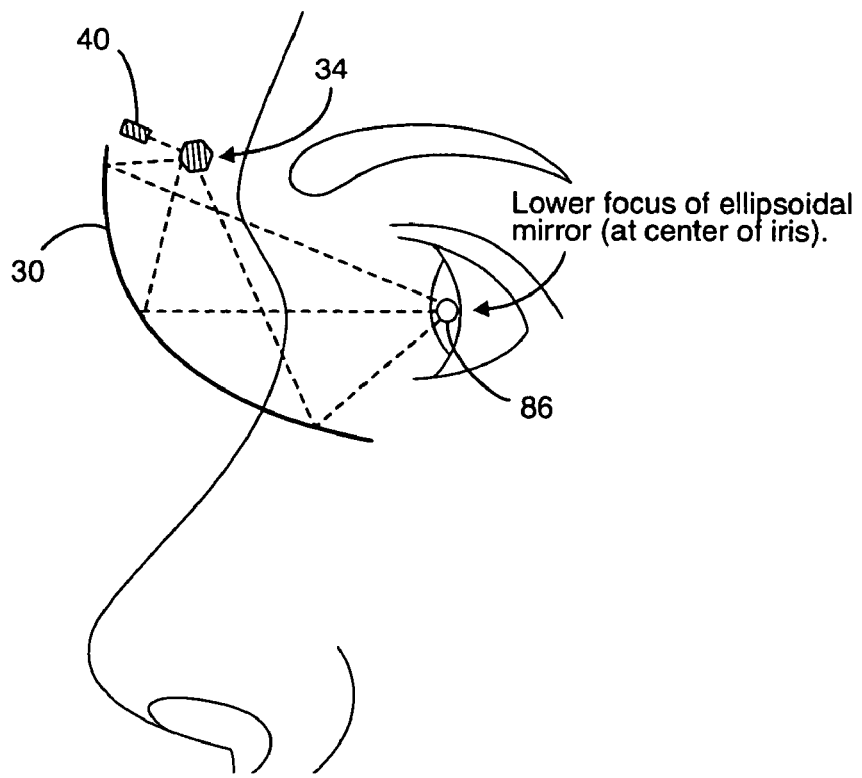
FIG. 9 illustrates a side view of an optical configuration of a user wearing the display incorporating a mirror scanner.
Figure 10:
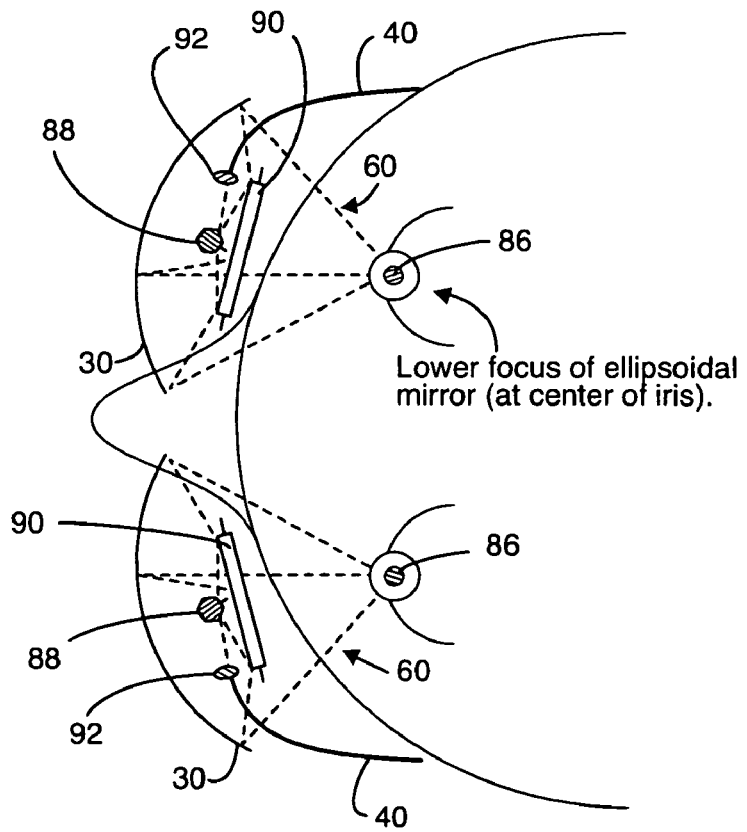
FIG. 10 illustrates a top plan view of a user wearing the display of FIG. 9.

In the alternative, the light sources may be mixed by dichroic mirror or prism assembly, as illustrated in FIG. 8. For example, if the image source 24 is a computer, a VGA cable 50 would be used to carry horizontal and vertical synchronization signals 52 and 54, as well as red, blue and green image signals 56-60. The horizontal and vertical synchronization signals 52 and 54 travel, respectively, to horizontal and vertical circuits 62 and 64, that generate what is necessary to synchronize the scanners 32 with the image generator 22. The circuits 62 and 64 output signals to the scan drive cable 66 which carries the signals to the scanners 32 of the display 26. As illustrated in FIG. 1, a scan driver 68 may be used to control the scanning of scanners 32 by other means as well.

The red, blue and green image signals 56-60 are passed through current drivers 70 before reaching their respective red, blue and green LED's 72-76. The current drivers 70 adjust the amount of current through the LED's 72-76. The light emitted from the green, blue and red LED's 72-76 could then be directly passed through the mixer 44, as described above.

If the dichroic beam mixing method is used, each LED 72-76 emits light which is passed through a respective collimating lens 78 which collimates the light prior to the light hitting a dichroic mirror assembly 80, where the light passes through dichroic mirrors 82 and 84 and then emitted directly to the fiber optic cable 40. That is, light from the green LED 76 passes through the collimating lens 78 to one portion of the dichroic mirror 82 or 84 which then reflects the light through another portion 82 or 84 of the dichroic mirror to the fiber optic cable 40. Light from the blue LED and red LED 72 and 78 are similarly transferred through the dichroic mirror assembly 80 to the fiber optic cable 40.

In the alternative, the optical beam modulator 38 may be a commercially available self-collimating assembly.

The head-mounted display 26 utilizes any one of a number of scanning means to raster-scan the optical image coming from the image generator 22 across the ellipsoidal semi-reflective reflector lenses 30. Light is then reflected off of each lens 30, projecting a wide field image through the pupils of the user's eyes 86, as described above.

With reference now to FIGS. 9-13, a rotating mirror scanner assembly is illustrated. Modulated light emitted from the optic fiber 40 hits a spinning horizontal scan mirror 88. The light is then reflected off of the horizontal mirror 88 to a vertically rotating scan mirror 90. The vertical scan mirror 90 then reflects the light towards the ellipsoidal reflector 30, where the light is then reflected into the lens of the user's eye 86. A collimating lens 92 may be beneficially disposed between the optic fiber 40 and the horizontal mirror 88 to enhance the resulting image.

The rotating horizontal and vertical mirrors 88 and 90 are polygonal, typically hexagonal, in exterior confirmation. Each mirror 88 and 90 is rotated at a very high speed, between 300 RPM and 150,000 RPM. This effectively produces the raster-scan onto the inner reflective surface of the reflector lens and creates the resultant lined image viewed by the user. The curvature of the surface of each of the scanning mirrors 88 and 90 may be designed to compensate for the curvature of the surface of the ellipsoidal reflectors 30 in order to focus before hitting the pupil of the user's eye. Curvatures can be adjusted for an individual's unique eye prescription.

Figure 12:
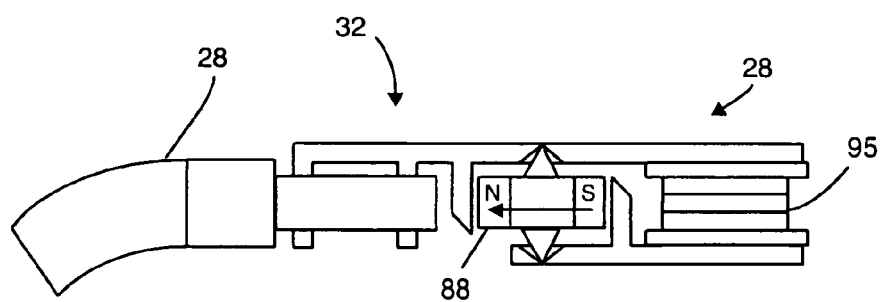
FIG. 12 illustrates a rotating hexagonal mirror mechanism for scanning the optical beam in accordance with the present invention.
Figure 13:
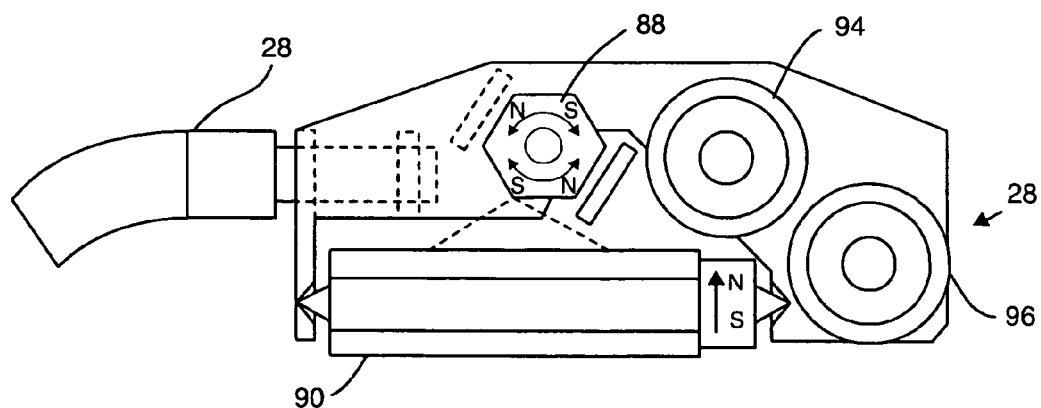
FIG. 13 is a top horizontal and vertical view, similar to FIG. 12, illustrating rotating hexagonal mirrors and drivers of the mirror mechanism of FIG. 12 for scanning the optical beam in accordance with the present invention.

With reference to FIGS. 12 and 13, the horizontal and vertical scan mirrors 88 and 90 are attached to the display frame 28. Each mirror 88 and 90 is controllably rotated by a driver 94 and 96, respectively. In a particularly preferred embodiment, the drivers 94 and 96 magnetically induce the rotation of the mirrors 88 and 90. As such, the scan mirrors 88 and 90 may be made of a ferromagnetic material so as to be made into a magnet or have a magnet imbedded within, as shown in FIGS. 12 and 13. The direction each scan mirror 88 or 90 moves is determined by the N-S orientation of the magnetized mirror 88 or 90, as shown by the arrows in FIGS. 12 and 13. The drive coils 94 and 96 magnetically induce the horizontal and vertical scan mirrors 88 and 90 to rotate, as is known in the art, by use of electric coils and the like. Due to the high speed of rotation of the mirrors 88 and 90, the mirror assembly may be disposed within a protective cage or behind a protective barrier to prevent injury in the case of malfunction.

Figure 11:
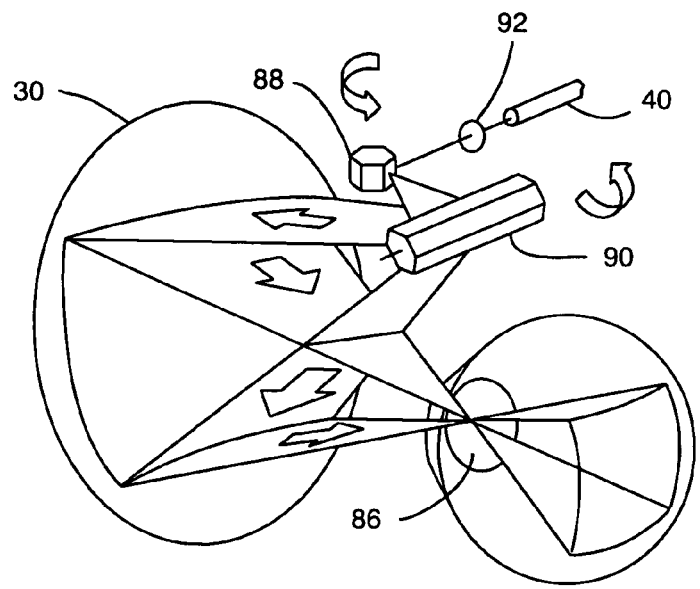
FIG. 11 illustrates a perspective view of the optical principles and path of an optical beam as the beam passes through a scanner, off a reflecting ellipsoid and into a user's eye.

FIG. 11 illustrates the travel of the light beam from the optic fiber 40, to the horizontal scan mirror 88, to the vertical scan mirror 90, to the reflector lens 30 and into the user's eye 86, where the image is viewed. Typically, the horizontal scan mirror 88 is six-sided and can rotate up to 150,000 RPM on a vertical spin axis. The vertical scan mirror 90 is also six-sided and is rotated at 300 RPM on a horizontal spin axis. The vertical scan mirror is located at the upper focus of the ellipsoidal reflector 30. The lower focus of the ellipsoidal reflector 30 is located, generally, at the center of the iris of the lens of each user's eyes 86. With these parameters, the system operates at a 30 Hz frame rate, 500 lines×1000 pixels, 120×60° field of view at 50 Hz pixel rate.

Figure 14:
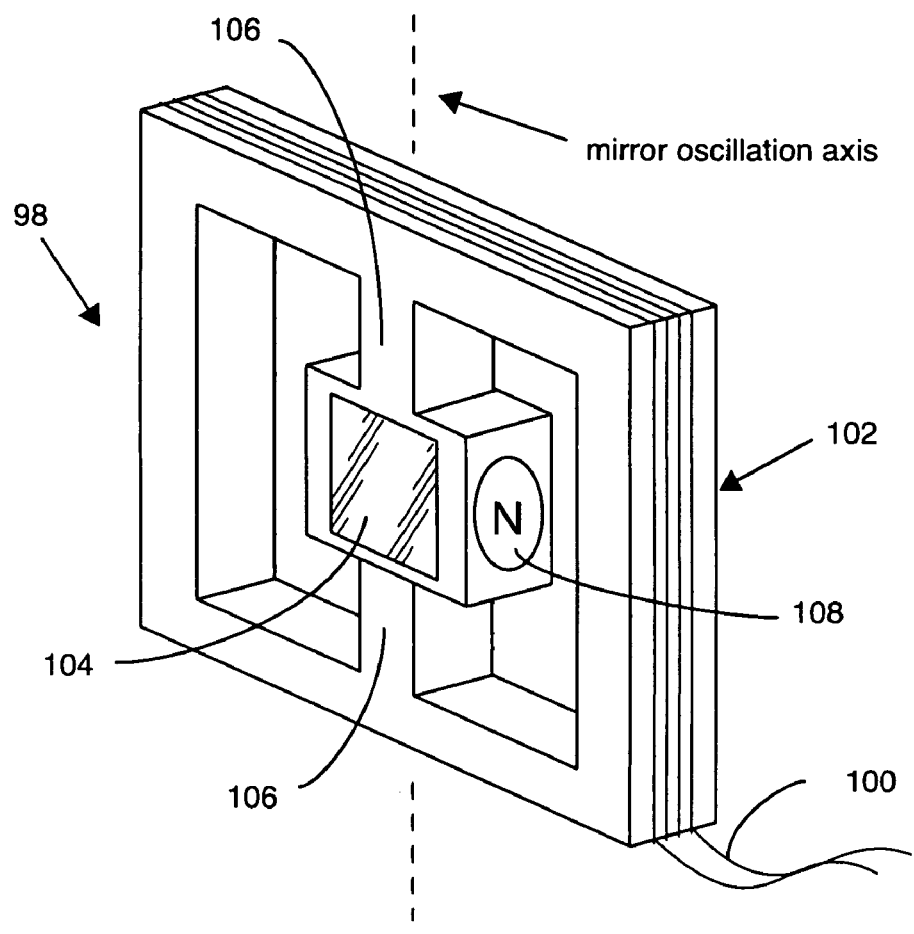
FIG. 14 illustrates a torsional oscillator scanner which can be used in accordance with one embodiment of the present invention.

With reference now to FIG. 14, an alternative torsional scanner 98 is illustrated which can be used in lieu of the horizontal and vertical mirrors 88 and 90. Electrical leads 100 provide current to a scan drive coil 102 which surrounds a magnetized mirror 104 connected to the scan drive coil 102 with torsion arms 106. As the current is passed through the scan drive 102, magnets 108 associated with the mirror 104 are moved, causing the torsional arms 106 to twist. This alters the reflective angle of the mirror 104. This can be done at a very high rate to raster-scan the optical image onto the reflector 30.

Figure 15:
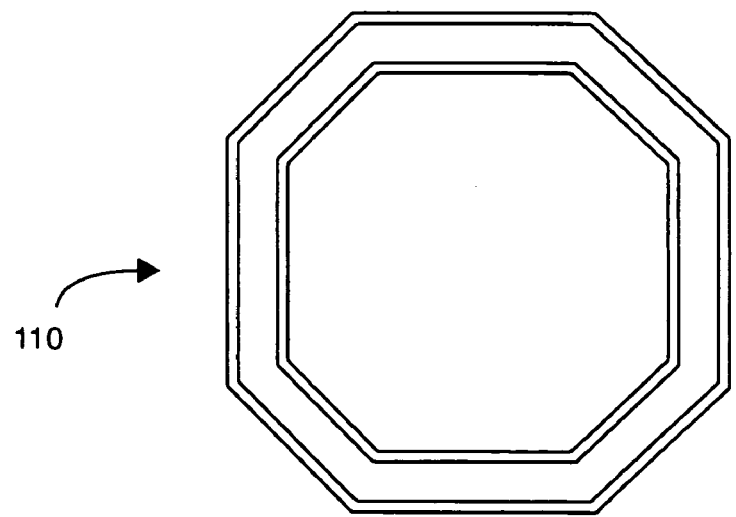
FIG. 15 illustrates a micro-electronic mirror (MEM) scanning device, which is an alternative means of scanning an optical beam within the display.

With reference now to FIG. 15, yet alternatively, the raster-scan may be performed using a solid state micro-electronic mirror (MEM) device 110. Such devices are known in the art and can either individually or as an array be used to raster-scan the image onto the reflector 30. The invention also contemplates the mixing of scan methodologies as described above, such as replacing the horizontal scan mirror 88 with either the torsional scanner or MEM. Other combinations are feasible as well.

With reference back to FIG. 1, the scan driver 68 obtains information from the image resampling processor 36 and synchronizes the operation of the scanner 32 with respect to the generated signals emitted from the modulator 38. For example, the scan driver 68 would control the drivers 94 and 96 such that the speed of rotation of the mirrors 88 and 90, or other scanning means, was synchronized with the output signal image.

With reference again to FIGS. 1 and 2, the display 26 may include a motion/orientation sensor 112, such as an accelerometer or solid state gyroscope, which detect head movement of the user. Such sensors 112 would send motion signals 114 to a head position processor 116, such as a chip located on the image generator 22, which would then determine head position and calculate the differential motion and orientation angles to match the generated images with the new head position so as to provide real-time rendered simulations or submerse the user in a 3D environment.

It will be appreciated from the foregoing description that the personal viewer system 20 of the present invention provides the user with 120° horizontal field of view in each eye, with a 60° overlap at center, providing a total 180° field of view. The user is provided with a 90° vertical field of view in each eye, approximating the natural horizontal and vertical field of view of unencumbered human vision. The system 20 of the present invention additionally provides the user with complete stereoscopic separation, using a raster-scan optical beam that is reflected directly into the pupil of the user's eye from the ellipsoidal reflector 30. Thus, the user, wearing a head-mounted display 26 similar to a pair of eyeglasses, views a see-through image approximating a natural view, which can be adapted to a 3D environment.

Although several embodiments have been described in detail for purposes of illustration, various modifications may be made without departing from the scope and spirit of the invention. Accordingly, the invention is not to be limited, except as by the appended claims.

What is claimed is:

1. A personal viewer system, comprising:
an electronic image source;
an optical generator adapted to receive an electronic signal from the electronic image source and convert the signal into a light-based optical image; and
a head-mounted display including means for receiving the optical image, at least one ellipsoid reflector positionable in front of an eye of a user, and means for scanning the image onto the at least one ellipsoid reflector such that the image is reflected into the eye of the user.

2. The system of claim 1, wherein the optical generator comprises an image buffer adapted to receive and store electronic image signals form the electronic image source, an image resampling processor in communication with the image buffer, and an optical beam modulator in communication with the image resampling processor and adapted to emit a light-based optical image.

3. The system of claim 2, wherein the image resampling processor includes a resampling transformation algorithm for correcting geometric distortion of the electronic image signal.

4. The system of claim 2, wherein the optical beam modulator creates a tricolor optical light emission.

5. The system of claim 4, wherein the means for receiving and scanning the image comprises a scanner disposed relative to the optical beam modulator to scan the light emission onto the at least one ellipsoid reflector.

6. The system of claim 5, including an optical fiber for conducting the light emission from the optical beam modulator to the scanner.

7. The system of claim 6, including a optical image mixer disposed between the optical beam modulator and the optical fiber for converting the tricolor optical light emission to a single optical light emission.

8. The system of claim 7, wherein the optical image mixer comprises a mixing cavity having a white inner reflective surface for mixing the tricolor light emission and reflecting the mixed light through a pinhole exit into the optical fiber.

9. The system of claim 7, wherein the optical image mixer comprises dichroic mirrors or prisms.

10. The system of claim 6, wherein the means for receiving and scanning the image comprises a scanner disposed relative to an outlet end of the optical fiber to scan the light emission onto the at least one ellipsoid reflector.

11. The system of claim 1, wherein the image scanning means comprises a torsion oscillator scan mirror for scanning the optical image onto the at least one ellipsoidal reflector.

12. The system of claim 1, wherein the image scanning means comprises a solid state micro-electric mirror for scanning the optical image onto the at least one ellipsoidal reflector.

13. The system of claim 1, wherein the image scanning means comprises a mirror assembly for scanning the optical image onto the at least one ellipsoidal reflector.

14. The system of claim 13, wherein the mirror assembly comprises a first rotatable mirror for receiving the optical image and reflecting the image onto a second rotatable mirror adapted to scan the image onto the at least one ellipsoidal reflector.

15. The system of claim 14, including a driver for adjustably controlling the speed of rotation of the first and second mirrors.

16. The system of claim 15, wherein the driver magnetically induces the rotation of the first and second mirrors.

17. The system of claim 1, wherein the at least one ellipsoidal reflector has an inner surface that is partially reflective so as to permit viewing therethrough.

18. The system of claim 1, wherein the head-mounted display includes a motion orientation sensor in communication with the signal generator or image source for altering the generated image as the user's head is moved.

* * * * *